United States Patent [19]

Fenzau et al.

[11] Patent Number: 5,042,373
[45] Date of Patent: Aug. 27, 1991

[54] GUARD FOR THE NIPS OF ROLLS IN CALENDERS AND LIKE MACHINES

[75] Inventors: Hilmar Fenzau, Korschenbroich; Franz Kayser, Geldern; Jürgen Schlunke; Hartmut Wilke, both of Krefeld, all of Fed. Rep. of Germany

[73] Assignee: Kleinewefers GmbH, Krefeld, Fed. Rep. of Germany

[21] Appl. No.: 439,541

[22] Filed: Nov. 20, 1989

[30] Foreign Application Priority Data

Nov. 18, 1988 [DE] Fed. Rep. of Germany ....... 3839056

[51] Int. Cl.$^5$ .................. F16P 3/12; B30B 15/00; B30B 3/00
[52] U.S. Cl. .................. 100/93 RP; 34/117; 100/53; 100/73; 100/74; 100/173
[58] Field of Search ............ 100/53, 73, 74, 75, 100/93 RP, 155 R, 161, 173; 101/424.1; 34/116, 117, 120

[56] References Cited

U.S. PATENT DOCUMENTS

| 629,937 | 8/1899 | Trotman | 100/74 |
| 2,993,432 | 7/1961 | Youngchild | 100/93 |
| 3,337,968 | 8/1967 | Krikorian et al. | 34/116 |
| 3,994,769 | 11/1976 | Gersbeck | 100/93 RP |
| 4,295,421 | 10/1981 | Abendroth et al. | 100/53 |
| 4,454,812 | 6/1984 | Johne et al. | 100/53 |
| 4,748,906 | 6/1988 | Ashmore | 100/162 B |
| 4,867,055 | 9/1989 | Hütter et al. | 100/173 |

FOREIGN PATENT DOCUMENTS 1295993 5/1969 Fed. Rep. of Germany.
3503448 8/1985 Fed. Rep. of Germany.

Primary Examiner—Paul T. Sewell
Assistant Examiner—M. Denise Patterson
Attorney, Agent, or Firm—Peter K. Kontler

[57] ABSTRACT

A guard at the inlet side of the nip of two rolls in a calender has a hollow support for two blocking devices with movable sections extending close to the peripheral surfaces of the rolls to prevent injury to the fingers of an operator. The support defines one or more channels for steam or for another fluid medium which is discharged through one or more rows of ports to moisturize a running web of paper, foil or textile material or to dry, heat or cool the web and/or the rolls.

15 Claims, 1 Drawing Sheet

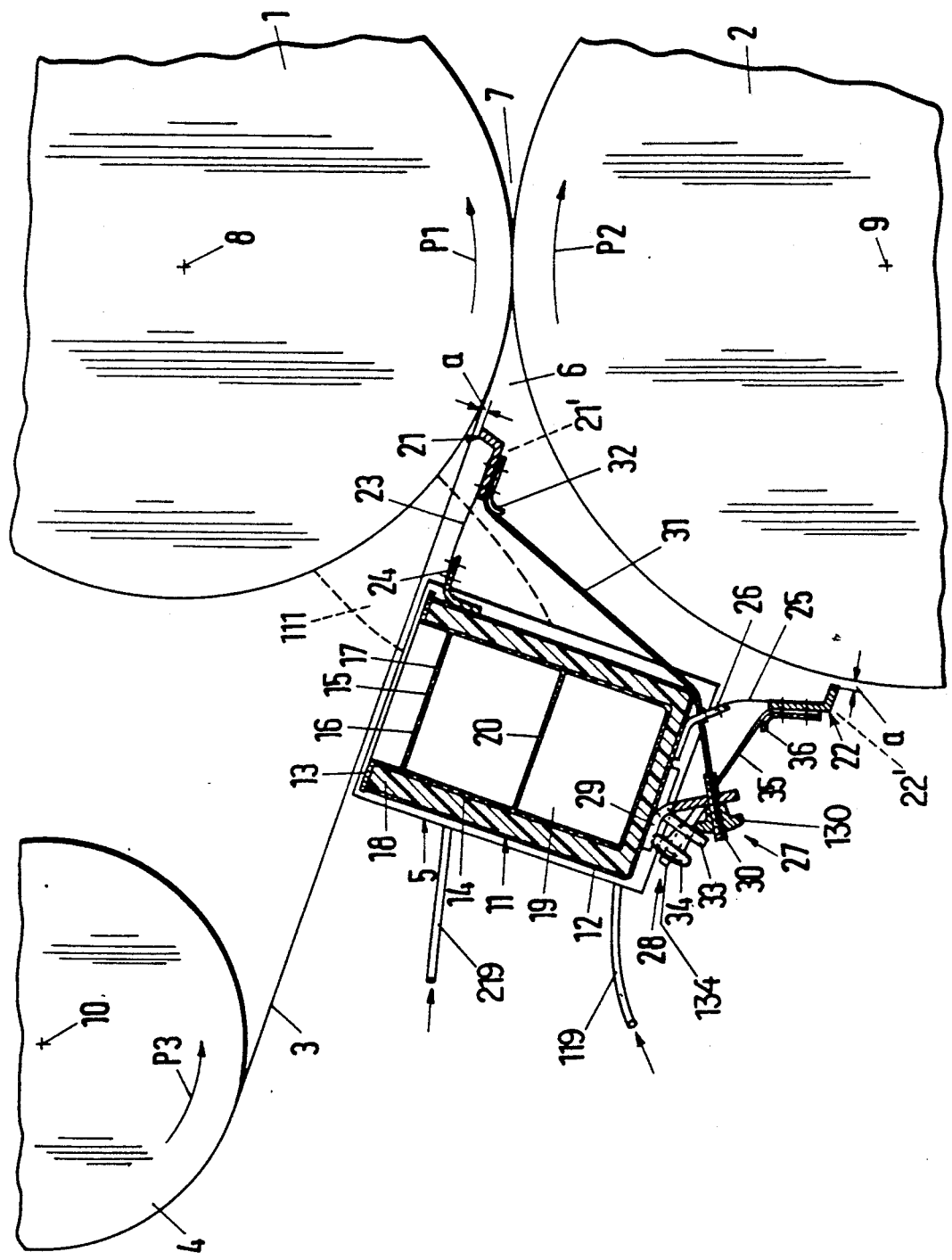

GUARD FOR THE NIPS OF ROLLS IN CALENDERS AND LIKE MACHINES

BACKGROUND OF THE INVENTION

The invention relates to calenders and like machines for the treatment of running webs of paper, textile material or the like. More particularly, the invention relates to improvements in guards for the inlet sides of nips of pairs of rolls which are used in calenders and like machines. Still more particularly, the invention relates to improvements in guards of the type disclosed in commonly owned U.S. patent application Ser. No. 205,082 filed June 9, 1988 by Egon Hütter et al. for "Guard for the nips of rolls in calenders", now U.S. Pat. No. 4,867,055 granted Sept. 19, 1989.

The application of Hütter et al. discloses a guard wherein an elongated hollow support extends longitudinally of the inlet side of the nip of two rolls. The support is mounted in the frame of the machine and carries two elongated strip-shaped blocking devices each closely adjacent one of the rolls which define the nip. The blocking devices comprise sets of individually movable sections, and the support carries devices which can move individual sections relative to the respective roll as well as relative to other sections of the respective blocking device. The devices for moving the sections of the two blocking devices include motion transmitting rods which extend through the support. The purpose of multi-section adjustable blocking devices is to ensure that the width of the clearance between a blocking device and the adjacent roll does not exceed a value (e.g., 8 millimeters) which is prescribed by authorities and/or by labor unions in order to reduce the likelihood of injury to the hand of a careless operator. Adjustability of sections of the blocking device with reference to the adjacent rolls is necessary because the width of the aforementioned clearances between the rolls and the respective blocking devices often varies as a result of flexing of the rolls and/or of the carrier, as a result of thermally induced expansion or contraction of parts in the region of the nip, reduction of the diameters of the rolls and/or for other reasons.

It is already known to discharge a fluid against the rolls and/or against the running web in a calender or a like machine. As a rule, fluid is applied along the full length of the nip. For example, published German patent application No. 35 03 448 of Hanhikoski et al. discloses means for directing steam against the running web. Analogous steam directing means are disclosed in German Auslegeschrift No. 1 295 993 of Müller. U.S. Pat. No. 2,993,432 to Youngchild discloses an apparatus for heating or cooling calender rolls with hot or cold air. It is further known to provide fluid blowing tubes along the nips of rolls in calenders and like machines. In each instance, a device which defines an elongated fluid-conveying channel must be placed adjacent the inlet side of the nip of two rolls, and such channel-defining device is formed with one or more rows of fluid discharging orifices which direct streams or jets of a fluid medium toward the nip or toward the running web.

A drawback of conventional apparatus of the above outlined character is that they occupy a substantial amount of space, for example, at the inlet sides of the nips of pairs of rolls in calenders and like machines. This renders it necessary to increase the distance between successive nips which, in turn, can affect the stability or treatment of the running web and the quality of the finished web. Still further, a pipe or another device which is used solely as a means for directing fluid against the roll or rolls and/or against the running web in a calender or a like machine must be provided in addition to a guard; this creates serious problems due to crowding of numerous parts at the inlet sides of the nips.

OBJECTS OF THE INVENTION

An object of the invention is to provide a novel and improved guard for the inlet sides of nips of pairs of rolls in calenders and like machines which is more versatile than heretofore known guards.

Another object of the invention is to provide a guard which can be used in existing machines as a superior substitute for conventional guards and for certain other parts of such machines.

A further object of the invention is to provide a simple, compact and versatile guard which occupies little room at the inlet side of the nip of a pair of rolls in a calender or a like machine.

An additional object of the invention is to provide a novel and improved apparatus for supplying a gaseous or other fluid to a running web and/or to one or more rolls in a calender or a like machine.

Still another object of the invention is to provide a novel and improved support for use in the above outlined guard.

A further object of the invention is to provide a machine, such as a calender, which embodies the above outlined guard.

A further object of the invention is to provide a novel and improved combination of a guard and rolls for use in calenders and like machines.

An additional object of the invention is to provide a guard which can be adjusted in a novel and improved way to satisfy the regulations regarding the safety of workers in paper processing and/or other plants employing calenders or like machines.

Another object of the invention is to provide novel and improved means for adjusting the positions of blocking devices which are used in the above outlined guard to reduce the likelihood of injury to a careless or unskilled attendant.

A further object of the invention is to provide a novel and improved method of supplying a fluid medium to rolls and/or to the running web in a calender or a like machine.

SUMMARY OF THE INVENTION

The invention is embodied in an apparatus for treating a running web of textile material, paper or the like in a calender or an analogous machine. The improved apparatus comprises first and second elongated rolls which define an elongated nip having an inlet side for admission of the running web and an outlet side, and a novel and improved guard at the inlet side of the nip. The guard comprises a hollow support which, in accordance with a feature of the invention, defines a fluid conveying channel and extends substantially longitudinally of and is adjacent the nip, a first substantially strip-shaped elongated blocking device mounted on the support adjacent the first roll and extending longitudinally of the nip, and a second substantially strip-shaped elongated blocking device mounted on the support adjacent the second roll and extending longitudinally of the nip. At least one of the blocking devices has a plurality of sections which are arranged in a row extending longitudinally of the respective roll and being individually movable toward and away from the respective roll, and the guard further comprises means for moving the sections relative to each other and with reference to the respective roll. The end portions of the support are mounted on or in carrier means which, in turn, are installed in or form part of the frame of the machine in which the apparatus is put to use. The moving means can include a plurality of discrete moving devices, at least one for each movable section of the at least one blocking device, and the moving devices are spaced apart from each other in the longitudinal direction of the nip and are mounted on the support. The moving means is preferably mounted at the outer side (i.e., externally) of the support. The latter is provided with fluid discharging ports which form at least one row or file extending substantially longitudinally of the nip and communicating with the channel. At least one of the blocking devices is preferably offset with reference to the at least one file or row of ports in the circumferential direction of the hollow support. Furthermore, the moving means can be angularly offset with reference to the at least one file or row of ports in the circumferential direction of the support.

The guard preferably further comprises resilient means for biasing at least one of the blocking devices toward the respective roll. The moving means of such guard includes devices for moving the sections of the at least one blocking device between a plurality of different positions with reference to the respective roll against the opposition of the biasing means. The arrangement is preferably such that the biasing means permanently tend to move the sections of the at least one blocking device nearer to the respective roll and the moving devices are designed to move the sections away from the respective roll against the resistance of the biasing means and to maintain the sections at selected distances from the respective roll. Each moving device can comprise a cable, a cord, a rope or another flexible motion transmitting element. At least some of the flexible motion transmitting elements can contact and can be deflected by the external surface of the support. The resilient biasing means can comprise at least one leaf spring having a first portion connected to the one blocking device and a second portion connected with the support.

The support can have a polygonal (particularly a substantially square or rectangular) cross-sectional outline.

Each blocking device can comprise a plurality of sections, and the moving means then comprise first moving devices for the sections of the first blocking device and second moving devices for the sections of the second blocking device. Still further, the guard can comprise first holder means for the first moving devices and second holder means for the second moving devices. The first and second holder means can be mounted on the support adjacent each other. For example, the two holder means can be slightly offset relative to each other in the circumferential direction of the hollow support. The support can include a first elongated wall, a second elongated wall substantially opposite the first wall, and a third wall between the first and second walls. The at least one row or file of ports can be provided in the first wall, the first and second holder means can be mounted adjacent the second wall, and the guard can further comprise a device for connecting the first blocking device to the third wall and a device for connecting the second blocking device to the second wall.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a fragmentary end elevational view of an apparatus which embodies the invention, the support and certain other parts of the improved guard being shown in a transverse vertical sectional view and a moving web being paid out by a supply reel and extending along a guide roll and through the nip of the first and second rolls.

DESCRIPTION OF PREFERRED EMBODIMENTS

The drawing shows a portion of a calender or an analogous machine wherein running webs of paper, textile material or the like are treated to enhance their appearance and/or other characteristics. The machine includes an apparatus which comprises three main components, namely a first roll 1, a second roll 2 defining with the roll 1 an elongated nip 6 extending in parallelism with the axes of the rolls, and a guard 5 at the inlet side of the nip. The roll 1 is a so-called hard roll, and the roll 2 has a peripheral layer of elastomeric material. A third roll 4 serves as a guide for a running web 3 of paper or other flexible sheet or strip material. The roll 4 is driven in the direction of arrow P3 to advance successive increments of the web 3 toward the inlet side of the nip 6. The web 3 is treated during passage through the nip 6 and emerges at the outlet side 7 to be advanced toward a second nip, to a takeup reel or to another processing station, not shown.

The guard 5 not only serves as a means for preventing unauthorized access to the inlet of the nip 6 but also as a means for directing streams or jets of a moisturizing fluid (e.g., steam) against the adjacent side of the web 3 between the guide roll 4 and the nip 6. The rolls 1 and 2 are driven to rotate about their respective axes 8, 9 in directions which are indicated by arrows P1 and P2. The axis of the guide roll 4 is shown at 10.

The guard 5 comprises an elongated hollow support 11 which is disposed at the inlet side of the nip 6 and extends in parallelism with the axes 8, 9 of the rolls 1, 2. The illustrated hollow support 11 comprises an inner component 14 which has a substantially U-shaped cross-sectional outline. The free ends of the legs of the component 14 are provided with outwardly extending flanges 13. The component 14 is received in an outer component 12 having a U-shaped cross-sectional outline and defining with the component 14 a compartment which is filled with a layer 18 of heat insulating material. The support 11 further comprises a wall 15 which is adjacent the path of the web 3 and is provided with one or more files or rows of fluid discharging ports or orifices. The drawing shows that the wall 15 is formed with two parallel rows of ports 16 and 17.

The ports 16 and 17 communicate with an elongated fluid conveying channel 19 which is defined by the hollow support 11 and extends longitudinally of the nip 6. A conduit 119 which admits hot steam from a suitable source (not shown) into the channel 19 is connected with the support 11, e.g., at one end of the support. It is also possible to provide two or more conduits 119 which admit steam to two or more portions of the channel 19 at locations which are spaced apart from one another in the longitudinal direction of the support 11.

The reference character 20 denotes a partition which is provided in the hollow support 11 and is spaced apart from the wall 15 to divide the channel 19 into two smaller channels. The partition 20 can extend along a portion of the support 11 and enables the two portions of the channel 19 to receive fluid from different sources and/or to receive fluid at different pressures and/or temperatures. This enhances the versatility of the guard 5. For example, the partition 20 can be disposed in the central portion of the channel 19 to seal the upper part of the channel from the lower part (as seen in the drawing). This enables a second conduit 219 to admit steam at a first pressure into the upper portion of the channel 19 whereas the remaining portion of the channel 19 receives steam, at a different pressure, from the conduit 119. For example, the pressure of steam which is directed toward the marginal portions of the running web 3 can depart from the pressure of steam which is discharged to contact the median portion of the running web.

The support 11 can be furnished with two or more partitions to subdivide the channel 19 into three or more smaller channels.

The carriers 111 (one indicated by broken lines) which mount the end portions of the support 11 are installed in the machine frame in such a way that the entire guard 5 can be moved along an arcuate path about the axis 8 of the hard roll 1 in order to afford access to the inlet side of the nip 6 when the machine is not in actual use.

The support 11 carries two elongated strip-shaped blocking devices 21, 22 which are respectively adjacent the peripheral surfaces of the roll 1 and roll 2 to prevent unauthorized access to the inlet side of the nip 6. The blocking device 21 comprises a plurality of sections 21' which are movable independently of each other relative to the roll 1 and one of which is indicated in the drawing by broken lines. Analogously, the blocking device 22 comprises a plurality of sections 22' each which is movable relative to the roll 2 independently of the other sections. The sections 21' form a first row extending longitudinally of the nip 6, and the section 22' form a second row which also extends longitudinally of the nip. The clearance a between the sections 21' of the blocking device 21 and the adjacent portion of the peripheral surface of the roll 1 should not exceed 8 mm and can be much less, and the same applies for the clearance a between the sections 22' of the blocking device 22 and the adjacent portion of the peripheral surface of the roll 2. As mentioned above, the width of the clearances a is normally prescribed by authorities, by the unions or by the owner of the plant and should be sufficiently small to prevent accidental penetration of one or more fingers into the nip 6.

The guard 5 further comprises resilient means for biasing the strip-shaped blocking devices 21 and 22 toward the respective rolls 1 and 2. The illustrated biasing means comprises first leaf springs 23 (one shown) each having a first end portion connected with one of the sections 21' of the blocking device 21 and a second end portion secured to that wall of the hollow support 11 which confronts the roll 2. The means for biasing the blocking device 22 toward the roll 2 comprises additional leaf springs 25 each having a first end portion connected to one of the sections 22' and a second end portion connected to that wall of the support 11 which is remotest from the roll 1.

The means 27 for moving the sections 21' of the blocking device 21 against the opposition of the respective leaf springs 23 comprises a discrete moving device for each section 21', and each such moving device comprises an elongated flexible motion transmitting element 31 in the form of a wire, cable, strip, band, rope or cord which is deflected by the adjacent portion of the external surface of the support 11. One end portion of each flexible element 31 is connected with the respective section 21' and the other end portion of each flexible element 31 is connected to an externally threaded member 30 in a holder 29 serving to mount the moving means 27 on that wall of the support 11 which is remotest from the roll 1. The reference character 24 denotes a connecting member in the form of a bracket which is welded or otherwise secured to the support 11 and is connected with the adjacent ends of the leaf springs 23 for the sections 21'. The threaded member 30 can be moved axially relative to its holder 29 by a nut 130 of the moving means 27. The operator turns a selected nut 130 in one direction in order to move the respective section 21' further away from the roll 1 against the opposition of the corresponding leaf spring 23, or in the opposite direction in order to enable the corresponding prestressed spring 23 to move the section 21' nearer to the roll 1.

The leaf springs 25 are carried by a connecting member in the form of a bracket 26 which is welded or otherwise affixed to the support 11 adjacent the moving means 27.

The construction of the means 28 for moving the sections 22' of the blocking device 22 relative to the roll 2 is analogous to that of the moving means 27 except that the flexible motion transmitting elements 35 of the moving means 28 do not engage and are not deflected by the external surface of the support 11. The moving means 28 is secured to the support 11 by holder 33 adjacent the holder 29 and comprises a discrete moving device for each section 22'. Each such moving device comprises an externally threaded member 134 which is axially movably mounted in the holder 33 and is connected with one end of the respective motion transmitting element 35. The member 134 mates with a nut 34 which can be rotated by hand in a first direction to move the respective section 22' away from the roll 2 or in the opposite direction in order to enable the corresponding prestressed leaf spring 25 to move the respective section 22' nearer to the roll 2.

Those end portions of the flexible motion transmitting elements 31 which are remote from the holder 29 extend between the respective sections 21' and an adjacent rail 32, and those end portions of the motion transmitting elements 35 which are remote from the holder 33 extend between the respective sections 22' and an adjacent rail 36. The rails 32 and 36 are flexible and fixed to the sections 21' and 22', respectively, and are provided to clamp the flexible motion transmitting elements 31 and 35, respectively.

The moving means 27 can comprise two or more moving devices for each section 21', and the moving means 28 can comprise two or more moving devices for each section 22'.

Instead of employing blocking devices with discrete sections which are movable relative to each other and relative to the adjacent rolls, the guide 5 can comprise two one-piece blocking devices which are deformable so that selected sections of such deformable blocking devices can be moved by the corresponding moving devices in order to select the width of clearances a.

The illustrated hollow support 11 has a polygonal cross-sectional outline. More specifically, the illustrated support has a substantially square or at least slightly rectangular cross-sectional outline. It will be seen that the rows of ports 16, 17 are provided in that wall (15) of this polygonal support 11 which is adjacent the path of movement of the web 3 toward and into the nip 6, that the holders 29 and 33 are provided on the wall which is parallel to and spaced apart from the wall 15, and that the connecting bracket 24 for the leaf springs 23 is affixed to a third wall between the wall 15 and the wall for the holders 29, 33. The connecting bracket 26 for the leaf springs 26 is mounted on the wall which carries the holders 29 and 33. The nuts 130 and 34 are readily accessible to the operators at the underside of the support 11, and the non-accessible sections 21' of the blocking device 21 are readily adjustable by way of the flexible motion transmitting elements 31 which are deflected by the external surface of the support.

The improved guard 5 can be provided with a hollow support which has a circular, oval or other cross-sectional outline. The exact configuration of the support will depend on the availability of parts which are to be assembled into a support and on the dimensions and configuration of space which is available for the support at the inlet side of the nip of two rolls in a calender or a like machine. Moreover, the channel or channels of the support 11 or an analogous support can be used to deliver another fluid which is used for drying, moisturizing, cooling, heating and/or other treatment of successive increments of the web or of one or both rolls which define the nip 6. The improved guard can be installed in calenders or like machines which are designed for the treatment of paper webs, for the treatment of webs of textile material, for the treatment of metallic or plastic foils or for the treatment of other types of web- or strip-shaped material which is to be conveyed through the nip or nips of one or more pairs of rolls.

An important advantage of the improved guard is that its support 11 can perform a plurality of functions. Thus, the support 11 carries the two blocking devices 21, 22 as well as the means 23, 25 for biasing the sections 21', 22' of these blocking devices and the means 27, 28 for moving the sections 21', 22' relative to each other and with reference to the adjacent rolls 1, 2. In addition, the support 11 defines a path for the delivery of one or more pressurized fluid media to locations (such as the ports 16 and 17) where streams or jets of such fluid medium or media are directed toward the running web and/or toward one or both rolls. Such versatility of the support 11 contributes to compactness of the parts which must be installed at the inlet side of a nip to prevent injury to the attendants and to ensure proper cooling, heating, moisturizing, drying and/or other influencing of the web and/or of the rolls in the machine wherein the improved guard is put to use. A relatively compact guard which renders it possible to dispense with a discrete fluid supplying unit ensures that the running web need not cover a considerable distance on its way from a guide roll toward the nip or from one nip to the next nip. A reduction of the distance of a guide roll from the next-following nip or from one nip to another nip is often desirable and advantageous because the web is less likely to flutter and to develop creases and/or other undesirable irregularities.

The provision of one or more fluid-conveying channels in the support for the blocking devices does not result in undue weakening of the support, even though the support extends all the way from one end to the other end of the respective nip. If desired or necessary, the support 11 can be strengthened by stiffening ribs, reinforcing rods and/or in any other suitable way so that it can stand deforming stresses which develop in a calender or a like machine. As a rule, a support which is designed to support two blocking devices and the moving means for sections of the blocking devices is sufficiently stable to permit the making of one or more channels therein.

If the illustrated moving means 27 and 28 for the sections 21' and 22' of the blocking devices 21 and 22 are replaced with moving means having devices which extend in part through the support, the latter must be adequately sealed in those regions where the moving devices extend into and from its interior. Reference may be had to the aforementioned allowed copending patent application Ser. No. 205,082 which shows moving devices having elongated motion transmitting rods in the interior of a hollow support. The illustrated moving means 27 and 28 are preferred at the present time because their parts need not extend into the support 11 so that adequate sealing of the channel or channels 19 from the atmosphere (except where the fluid is supposed to issue from the support) presents no problems.

The feature that the strip-shaped blocking devices 21, 22, the holders 29, 33 and the connecting brackets 24, 26 are angularly offset with reference to the rows of ports 16 and 17 ensures that the flow of fluid from the channel or channels 19 toward the running web 3 (or toward the roll or rolls 1, 2 if the fluid is to influence the temperature and/or other characteristics of the rolls) is not obstructed by the other parts of the improved guard.

It is further within the purview of the invention to employ a blocking device with non-adjustable sections and a blocking device with a row of two or more adjustable sections. The provision of two blocking devices each of which has a row of movable sections is preferred at this time because this contributes to greater versatility of the improved guard. The illustrated moving means 27, 28 cooperate with the leaf springs 23 and 25 to ensure that each and every section of both multiple-section blocking devices 21, 22 can be moved between a practically infinite number of different positions, either under the bias of the prestressed leaf springs or against the opposition of such leaf springs (by way of the respective flexible elements 31, 35). Each flexible element can consist of or can contain a piece of metallic or plastic wire (e.g., steel wire), a metallic, plastic or fibrous strip, a cord, a rope or the like.

A support which has a polygonal cross-sectional outline with an external surface consisting of several elongated flat portions is preferred at this time because this simplifies the mounting of the connecting brackets 24, 26 and holders 29, 33. In addition, the illustrated support (or an analogous support which has a polygonal cross-sectional outline) can stand pronounced deforming stresses in spite of the fact that it is formed with one or more fluid conveying channels. The placing of moving means 27, 28 next to each other adjacent the external surface of a selected wall of the support 11 enables an attendant to adjust the positions of sections 21' and/or 22' with a minimum of effort at one and the same side of the guard. The aforediscussed distribution of ports 16, 17, connecting brackets 24, 26 and holders 29, 33 in or adjacent three different walls of the support 11 has been found to be especially suited to ensure that the improved guard will take up a small amount of space at the inlet side of the nip and will be capable of distributing steam upon the adjacent portions of a running paper web.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for treating a running web of paper, textile material or the like in a calendar or a like machine, comprising first and second elongated rolls defining an elongated nip having an inlet side for admission of the running web and an outlet side; and a guard at the inlet side of said nip, said guard including a hollow support defining a substantially sealed fluid conveying channel and extending substantially longitudinally of and adjacent said nip, a first substantially strip-shaped elongated blocking device mounted on said support adjacent said first roll and extending longitudinally of said nip, a second substantially strip-shaped elongated blocking device mounted on said support adjacent said second roll and extending longitudinally of said nip, each of said blocking devices having a plurality of sections arranged in a row extending longitudinally of the respective roll and being movable toward and away from the respective roll, and means for moving said sections, said moving means including first moving devices for the sections of said first blocking device, second moving devices for the sections of said second blocking device, first holder means for said first moving devices and second holder means for said second moving devices, said first and second holder means being mounted on said support adjacent each other, said support having fluid discharging ports communicating with said channel and being offset with reference to said blocking devices in the circumferential direction of said support, said moving means being disposed—in its entirety—externally of said support and being offset relative to said ports in the circumferential direction of said support.

2. The apparatus of claim 1, wherein said support has first and second end portions, and further comprising carrier means for the end portions of said support.

3. The apparatus of claim 1, wherein said first moving devices and said second moving devices are spaced apart from each other in the longitudinal direction of said nip.

4. The apparatus of claim 1, wherein said support has an outer side and said moving means is mounted at the outer side of said support.

5. The apparatus of claim 1, wherein said ports form at least one row extending longitudinally of said nip.

6. The apparatus of claim 1, wherein said guard further comprises resilient means for biasing said blocking devices toward the respective rolls.

7. The apparatus of claim 6, wherein said moving devices for moving said sections between a plurality of different positions with reference to the respective rolls against the opposition of said biasing means.

8. The apparatus of claim 7, wherein said moving devices include flexible motion transmitting elements.

9. The apparatus of claim 1, wherein said support has a polygonal cross-sectional outline.

10. The apparatus of claim 9, wherein said support has a substantially square or rectangular cross-sectional outline.

11. The apparatus of claim 1, wherein said first holder means is angularly offset with reference to said second hold means in the circumferential direction of said support.

12. The apparatus of claim 1, wherein said support includes a first elongated wall, a second elongated wall substantially opposite said first wall, and a third elongated wall between said first and second walls, said ports forming at least one row provided in said first wall and extending longitudinally of said nip, said first and second holder means being adjacent said second wall and said guard further comprising means for connecting said first blocking device to said third wall.

13. The apparatus of claim 12, further comprising means for connecting said second blocking device to said second wall.

14. Apparatus for treating a running web of paper, textile material or the like in a calender or a like machine, comprising first and second elongated rolls defining an elongated nip having an inlet side for admission of the running web an an outlet side; and a guard at the inlet side of said nip, said guard including a hollow support defining a fluid conveying channel and extending substantially longitudinally of and adjacent said nip, a first substantially strip-shaped elongated blocking device mounted on said support adjacent said first roll and extending longitudinally of said nip, a second substantially strip-shaped elongated blocking device mounted on said support adjacent said second roll and extending longitudinally of said nip, at least one of said blocking devices having a plurality of sections arranged in a row extending longitudinally of the respective roll and being movable toward and away from the respective roll, means for moving said sections, and resilient means for biasing at least said one blocking device toward the respective roll, said moving means including devices for moving said sections between a plurality of different positions with reference to the respective roll against the opposition of said biasing means and said moving devices including flexible motion transmitting elements, said support having an external surface and at least some of said motion transmitting elements contacting and being deflected by said external surface.

15. Apparatus for treating a running web of paper, textile material or the like in a calender or a like machine, comprising first and second elongated rolls defining an elongated nip having an inlet side for admission of the running web an outlet side; and a guard at the inlet side of said nip, said guard including a hollow support defining a fluid conveying channel and extending substantially longitudinally of and adjacent said nip, a first substantially strip-shaped elongated blocking device mounted on said support adjacent said first roll and extending longitudinally of said nip, a second substantially strip-shaped elongated blocking device mounted on said support adjacent said second roll and extending longitudinally of said nip, at least one of said blocking devices having a plurality of sections arranged in a row extending longitudinally of the respective roll and being movable toward and away from the respective roll, means for moving said sections, and resilient means for biasing at least said one blocking device toward the respective roll, said resilient means comprising at least one leaf spring having a first portion connected to said one blocking device and a second portion connected to said support.

* * * * *